United States Patent [19]

Jung

[11] Patent Number: 5,619,281
[45] Date of Patent: Apr. 8, 1997

[54] METHOD AND APPARATUS FOR DETECTING MOTION VECTORS IN A FRAME DECIMATING VIDEO ENCODER

[75] Inventor: Hae-Mook Jung, Seoul, Rep. of Korea

[73] Assignee: Daewoo Electronics Co., Ltd, Seoul, Rep. of Korea

[21] Appl. No.: 367,365

[22] Filed: Dec. 30, 1994

[51] Int. Cl.⁶ .............................. H04N 7/46; H04N 7/50; H04N 7/36
[52] U.S. Cl. .................................... 348/699; 348/416
[58] Field of Search ..................... 348/699, 416, 348/402, 407, 413; H04N 7/46, 7/50, 7/36

[56] References Cited

U.S. PATENT DOCUMENTS

| | | | |
|---|---|---|---|
| 5,113,255 | 5/1992 | Nagata et al. | 348/699 |
| 5,241,608 | 8/1993 | Fogel | 348/416 |
| 5,253,054 | 10/1993 | Fujiwara et al. | 348/699 |
| 5,398,068 | 3/1995 | Liu et al. | 348/416 |
| 5,418,570 | 5/1995 | Ueno et al. | 348/413 |
| 5,453,801 | 9/1995 | Kim | 348/699 |

FOREIGN PATENT DOCUMENTS

| | | | |
|---|---|---|---|
| 0397402 | 11/1990 | European Pat. Off. | H04N 7/24 |
| 0424026 | 4/1991 | European Pat. Off. | H04N 7/32 |
| 0518314 | 12/1992 | European Pat. Off. | H04N 7/32 |
| WO-A-9203799 | 3/1992 | WIPO | G06F 15/66 |

OTHER PUBLICATIONS

Nieweglowski et al., "A Novel Video Coding Scheme Based on Temporal Prediction using Digital Image Warping", IEEE 1993 International Conference on Consumer Electronics, pp. 2–3, Jun. 8, 1993.

May et al., "Picture Coding with Motion Analysis for Low Rate Transmission", IEEE International Conference on Communications, vol.1, pp. 2G71–2G75, Jun. 13, 1982.

Sullivan et al., "Motion Compensation for Video Compression using Control Grid Interpolation", ICASSP 91: International Conference on Acoustics, Speech and Signal Processing, vol. 4, pp. 2713–2716, Apr. 14, 1991.

Primary Examiner—Howard W. Britton
Assistant Examiner—Vu Le
Attorney, Agent, or Firm—Anderson Kill & Olick

[57] ABSTRACT

An improved motion estimating method serves to determine a set of target motion vectors between a current frame and its previous selected frame, wherein N number of frames are skipped between the current frame and the previous selected frame, said N being a positive integer inclusive of 1. This method is implemented through the use of all frames, i.e., the current and the previous selected frames and the N number of skipped frames in order to obtain a series of motion vectors for one of the search points within the previous selected frame. Said series of motion vectors is then summed up to define a target motion vector representing the displacement between said one of the search points and the corresponding best matching point in the current frame. The process is repeated until the set of target motion vectors for all of the search points contained in the previous selected frame are detected.

2 Claims, 5 Drawing Sheets

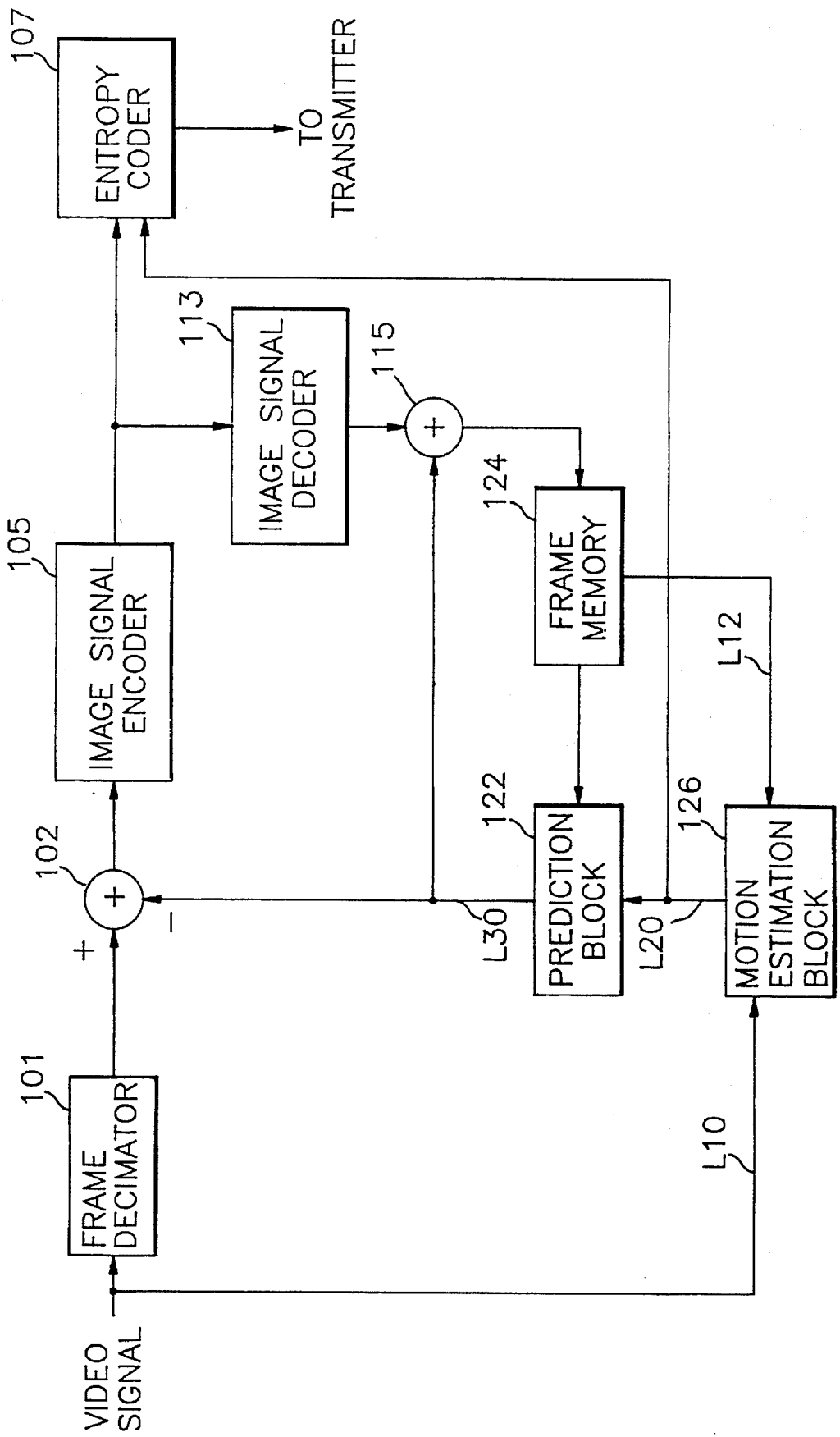

FIG. 2B
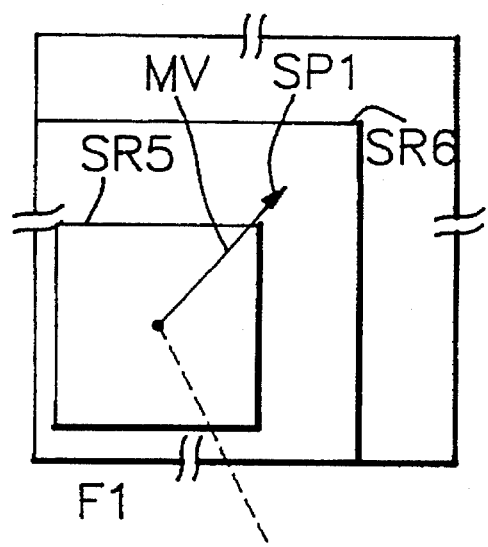
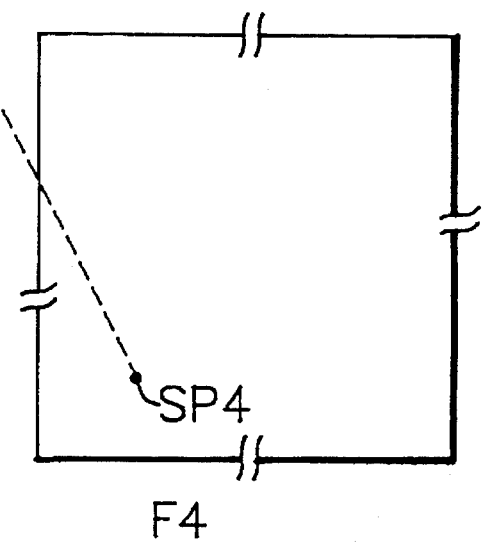

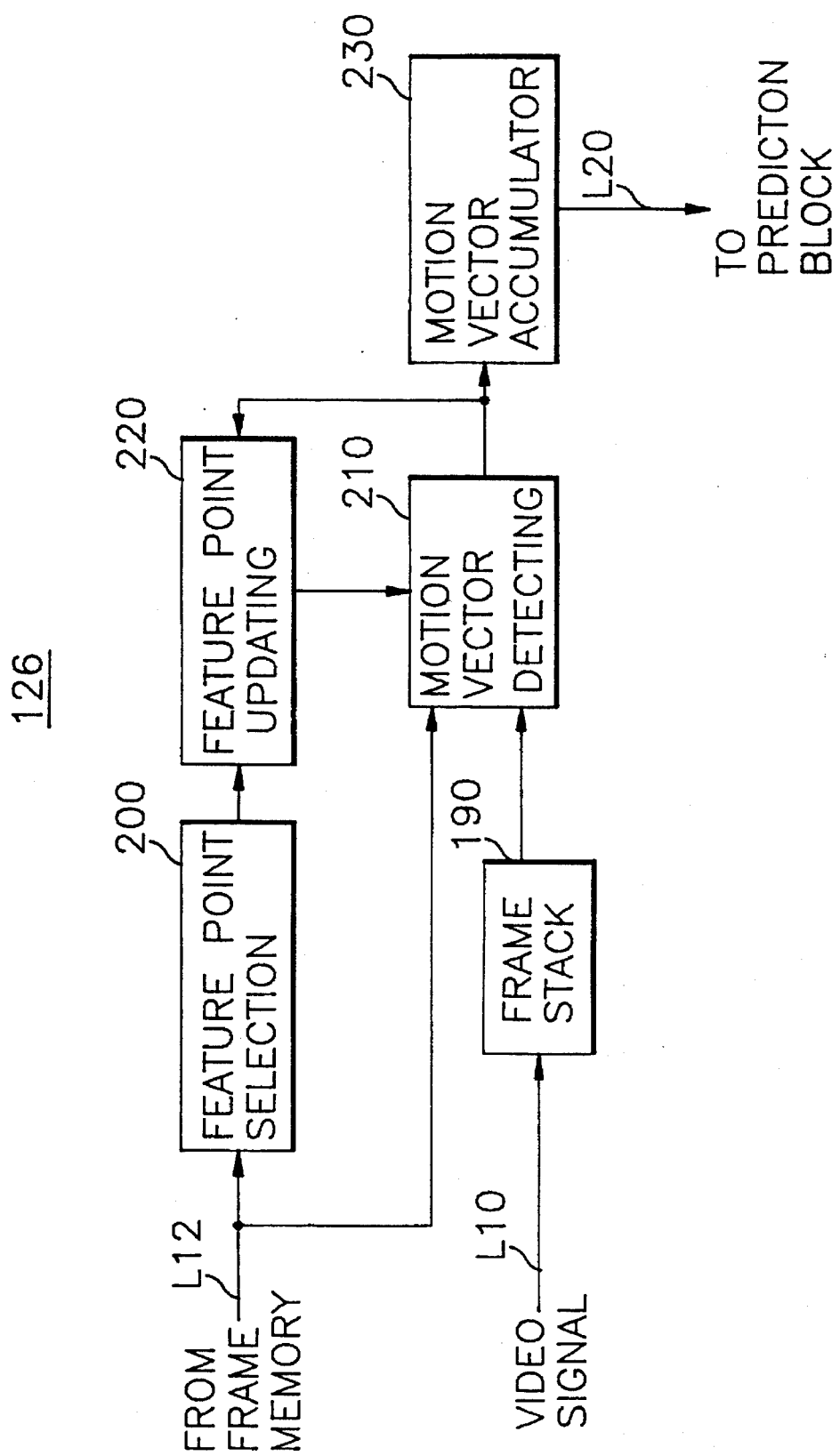

METHOD AND APPARATUS FOR DETECTING MOTION VECTORS IN A FRAME DECIMATING VIDEO ENCODER

FIELD OF THE INVENTION

The present invention relates to a method and an apparatus for encoding a video signal; and, more particularly, to a method and an apparatus for estimating a motion vector in a frame decimating video encoder employing a frame decimation technique along with pixel-by-pixel basis motion estimation and compensation for data compression.

DESCRIPTION OF THE PRIOR ART

As is well known, transmission of digitized video signals can deliver video images of much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data through the limited channel bandwidth, it is inevitable no compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse code modulation), two-dimensional DCT(discrete cosine transform), quantization of DCT coefficients, and VLC(variable length coding). The motion compensated DPCM is a process of determining the movement of an object between a current frame and its previous frame, and predicting the current frame according to the motion flow of the object to produce a differential signal representing the difference between the current frame and its prediction. This method is described, for example, in Staffan Ericsson, "Fixed and Adaptive Predictors for Hybrid Predictive/Transform Coding", *IEEE Transactions on Communications*, COM-33, No. 12(December 1985); and in Ninomiya and Ohtsuka, "A Motion-Compensated Interframe Coding Scheme for Television Pictures", *IEEE Transactions on Communications*, COM-30, No. 1 (January 1982).

Specifically, in the motion compensated DPCM, current frame data is predicted from the corresponding previous frame data based on an estimation of the motion between the current and the previous frames. Such estimated motion may be described in terms of two dimensional motion vectors representing the displacement of pixels between the previous and the current frames There have been many approaches to estimate the displacement of pixels of an object. Generally, they can be classified into two types, i.e., a block-by-block basis and a pixel-by-pixel basis motion estimation.

In the block-by-block basis motion estimation, a block in a current frame is compared with blocks in its previous frame until a best match is determined. From this, an interframe displacement vector (how much the block has moved between frames) for the whole block can be estimated for the current frame being transmitted. However, in the block-by-block basis motion estimation, a blocking effect at the boundary of a block may occur in the motion compensation process; and poor estimates may result if all pixels in the block do not move in a same way, to thereby decrease the overall coding efficiency.

Using a pixel-by-pixel approach, on the other hand, a displacement is determined for each and every pixel. This technique allows a more accurate estimation of the pixel value and has the ability to easily handle scale changes (e.g., zooming, movement perpendicular to the image plane). However, in the pixel-by-pixel approach, since a motion vector is determined at each and every pixel, it is impossible to transmit all of the motion vectors to a receiver in actuality. Therefore, motion vectors for a set of selected pixels, i.e., feature points, are transmitted to the receiver, wherein each of the feature points is defined as a position of a pixel capable of representing its neighboring pixels so that motion vectors for non-feature points can be recovered from those of the feature points in the receiver. The present invention is primarily concerned with the motion estimation using feature points. In an encoder which adopts the motion estimation based on feature points, a number of feature points are first selected from all of the pixels contained in the previous frame. Then, motion Vectors for each of the selected feature points are determined, wherein each of the motion vectors being a spatial displacement between one feature point in the current frame and a corresponding matching point, i.e., a most similar pixel, in the previous frame. Specifically, the matching point for each of the feature points is searched in a search region within a reference frame, e.g., a preceding frame, wherein the search region is defined as a region with a predetermined area which encloses the position of its corresponding feature point.

Another compression technique which can be implemented readily is a frame decimation method, which reduces the amount of data by encoding and transmitting only selected frames of video image and skipping or decimating the remaining frames existing therebetween(see, e.g., "Video Codec for Audiovisual Services at p×64 kb/s, " CCITT Recommendation H.261, CDM XV-R 37-E, International Telegraph and Telephone Consultative Committee (CCITT), August 1990).

Usually, the input to the video encoder is a video signal of 30 frames/sec. The frame rate resulting from the skipping of one, two or three frames between every two encoded frames is typically 15, 10 or 7.5 frames/sec, respectively.

In a conventional video encoder which employs both the hybrid coding and the frame decimation techniques, the selected frames of the video signal are encoded using both interframe and transform coding methods, and the motion vectors obtained from the interframe coding are detected between two successive encoded frames. Since some of the frames are skipped, the motion gap or displacement between two successive encoded frames becomes more abrupt than that of the undecimated original video signal, which leads to the generation of larger motion vectors. Therefore, to detect an optimum motion vector between two encoded frames, a larger search region in the previous encoded frame should be used with its size depending on the frame rate of the encoded frames or degree of decimation. Since the computational complexity of the block matching algorithm is normally proportional to the size of the search region, a larger computational burden for estimating the motion vectors may be imposed on the video encoder which adopts the frame decimation technique.

SUMMARY OF THE INVENTION

It is, therefore a primary object of the present invention to provide an improved method and apparatus for detecting motion vectors of feature points between two encoded frames in multiple steps for use in a frame decimating video encoder, thereby reducing the overall computational complexity of the video encoder.

In accordance with the present invention, there is provided a method for determining target motion vectors between a current frame and its previous selected frame for a set of search points, wherein N number of frames are skipped between the current frame and the previous selected frame, said N being a positive integer inclusive of 1, and the set of search points included in the previous selected frame is predetermined, which comprises the steps of:

(a) storing the N skipped frames;

(b) setting one of the search points as a reference search point;

(c) determining, for the reference search point, a best matching point included in a corresponding search region in an ith skipped frame, thereby generating an ith motion vector representing the displacement between the reference search point and the best matching point and setting the best matching point as the reference search point, wherein i is a number selected in the ascending order from 1 to N, a smaller value of i being related to a temporally closer frame to the previous selected frame;

(d) storing the ith motion vector;

(e) repeating said steps (c) through (d) above until the first to the Nth motion vectors are obtained;

(f) determining, for the reference search point, a best matching point included in a corresponding search region in the current frame, thereby generating an (N+1)st motion vector representing the displacement between the reference search point and the best matching point;

(g) summing up the (N+1) motion vectors so as to provide a target motion vector representing the displacement between said one of the search points and the corresponding best matching point in the current frame; and (h) repeating said steps (b) through (g) above until the set of target motion vectors for all of the search points is detected.

BRIEF DESCRIPTION OF THE DRAWINGS

The above and other objects and features of the present invention will become apparent from the following description of preferred embodiments given in conjunction with the accompanying drawings, in which:

FIG. 1 is a block diagram of a video encoder that employs a motion estimating block of the present invention;

FIGS. 2A and 2B illustrate differences between the inventive method and prior art motion estimation techniques;

FIG. 3 represents a block diagram of the motion estimating block of the present invention;

DETAILED DESCRIPTION OF THE PREFERRED EMBODIMENTS

Figure 2A:
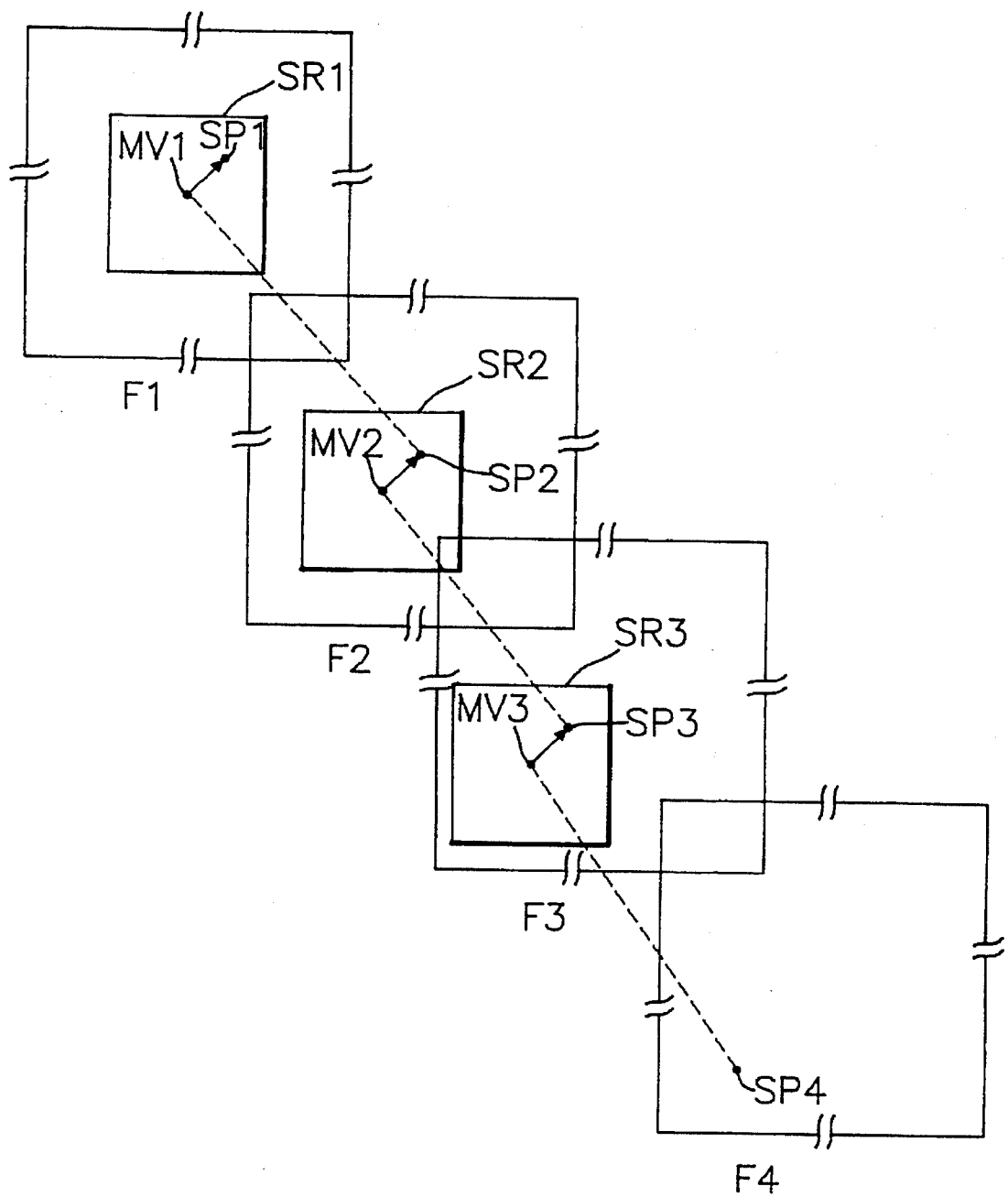

With reference to FIG. 1, there is shown a block diagram of a video encoder which employs a motion estimation block 126 of the present invention. An input digital video signal is fed to a frame decimator 101 and the motion estimation block 126. At the frame decimator 101, frames to be encoded are selected by skipping the intervening frames therebetween at a predetermined frame decimation ratio representing the degree of decimation, and fed to a subtracter 102. For example, the frame decimator 101 selects or uses every other or every third frame of the video signal if the predetermined decimation ratio is 2 or 3, respectively.

At the motion estimation block 126, the current or skipped frame signal on a line L10 and a reconstructed previous encoded frame signal on a line L12 from a frame memory 124 are processed to calculate and estimate a first set of motion vectors, each of which represents a displacement between a feature point of the current frame and a best matching point included in a corresponding search region in the previous encoded frame.

In accordance with the present invention, the motion vectors between two selected frames, i.e., the current frame and the previous encoded frame, are detected in multiple steps as described hereinafter with reference to FIGS. 2A and 3. In each of the steps, a motion vector between two successive frames, including skipped frames as well as encoded frames, is detected and stored, providing a motion vector between two encoded frames by adding the stored motion vectors thereafter.

The motion vector on a line L20 provided from the motion estimation block 126 is applied to a prediction block 122 and to an entropy coder 107.

Figure 4:
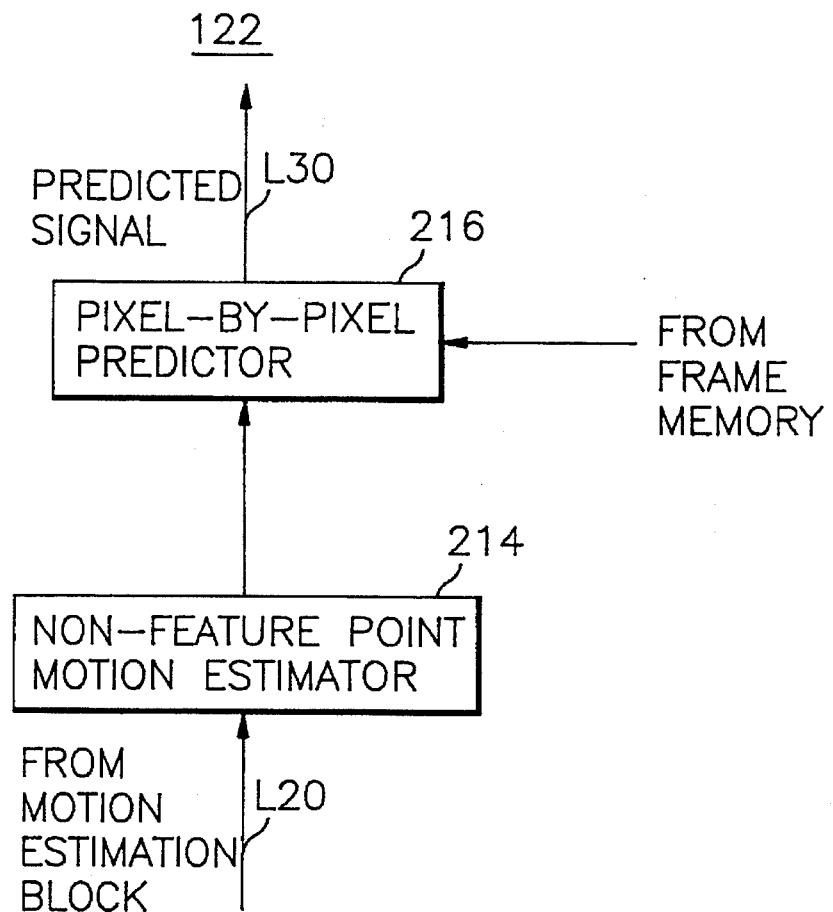
FIG. 4 depicts a block diagram of the prediction block shown in FIG. 1.

In response to the motion vector, a prediction signal is decided at the prediction block 122 on a pixel-by-pixel basis, as described in accordance with FIG. 4, and provided to the subtracter 102 and an adder 115 on a line L30.

The prediction signal from the prediction block 122 is subtracted from the current frame signal at the subtracter 102; and the resultant data, i.e., an error signal denoting the differential pixel value, is dispatched to an image signal encoder 105, wherein a set of error signals is encoded into a set of quantized transform coefficients by using, e.g., a discrete cosine transform(DCT) and any of the known quantization methods. Thereafter, the quantized transform coefficients are transmitted via two signal paths: one that leads to the entropy coder 107, wherein the quantized transform coefficients are coded together with the motion vector supplied through the line L20 by using, for example, a combination of run-length and variable length coding techniques for the transmission thereof; and the other leads to an image signal decoder 113, wherein the quantized transform coefficients are converted back into a reconstructed differential error signal by using the inverse quantization and inverse transform. Reconstruction of the error signal is required in order for the encoder to monitor the behavior of the decoder in a receiver to thereby prevent the decoder's reconstructed signal from diverging from the current frame signal.

The reconstructed error-signal from the image signal decoder 113 and the prediction signal from the prediction block 122 are combined at the adder 115 to provide a reconstructed current frame signal to be written onto the frame memory 124.

FIGS. 2A and 2B schematically illustrate the motion vector detecting method in accordance with the present invention and the conventional motion vector detecting method, respectively. For the purpose of present illustration, it is assumed that the frame decimation ratio is 3, i.e., two frames are skipped between the preceding encoded frame and the current selected frame to be encoded. FIG. 2A shows a procedure to estimate a motion vector between a current frame F1 and the previous encoded frame F4 stored at the frame memory 124 in accordance with the present invention. Two skipped frames, F2 and F3, are stored in a frame stack 190 shown in FIG. 3 which illustrates the details of the motion estimation block 126 shown in FIG. 1. First, a search region SR3 corresponding to a search point SP4 of the previous encoded frame F4 is determined in its subsequent skipped frame F3, wherein the search point SP4 is one of the feature points of the previous encoded frame F4. The best matching point of SP4 is decided from the search region SR3, providing a motion vector MV3 between F4 and F3. Thereafter, with the best matching point SP3 in F3 as a new search point, a corresponding search region SR2, displaced by MV3 from the search region SR3, its determined in its subsequent skipped frame F2. The best matching point of the search point SP3 is detected in SR2, providing a motion vector MV2 between F3 and F2. In a similar manner, a motion vector MV1 between F2 and the current frame F1 is detected. The final motion vector between the current frame F1 and the previous encoded frame F4 is a vector sum of MV1, MV2 and MV3, representing the displacement between the search point SP4 in F4 and the best matching point SP1 in F1.

The process of estimating a motion vector for a feature point in the previous encoded frame described above is repeated for all the other feature points in the previous encoded frame.

FIG. 2B shows a procedure for detecting a motion vector between a previous encoded frame F4 and the current frame F1 by using the prior art motion estimation scheme. The best matching point of the search point SP4 is decided directly in a search region in F1. If a search region of the same size as the one used in the method depicted in FIG. 2A, e.g, SR5, is used, the best matching point SP1 determined in the current frame F1 by the method of FIG. 2A will lie outside the boundary of the search region SR5. Therefore, to get a more exact motion vector, a larger search region, e.g., SR6, should be used. Actually, the magnitude of the motion between the current frame and the previous encoded frame largely depends on the frame decimation ratio. Therefore, to get a more exact motion vector, a larger search region in the current frame in proportion to the frame decimation ratio should be used. If a larger search region, e.g., SR6, is used to get an exact motion vector, the computational complexity for deciding a best matching point in the search region will increase in proportion to the size of the search region. Accordingly, the FIG. 2A method will impose less computational burden than the FIG. 2B method except for the extra computational time required to carry out the multi-step processing.

With reference to FIG. 3, there is shown a detailed block diagram of the motion estimation block 126 of the present invention shown in FIG. 1.

The video signal inputted to the motion estimation block 126 on the line L10 is fed to a frame stack 190. Specifically, the skipped frames and the current frame of the video signal are fed to the frame stack 190, stored therein to be provided therefrom to a motion vector detecting block 210.

The previous encoded frame retrieved from the frame memory 124 is inputted to a feature point selection block 200 and to the motion vector detecting block 210 via the line L12. At the feature points selection block 200, a number of feature points are selected among the pixels contained in the previous encoded frame. Each of the feature points is defined as a position of a pixel which is capable of representing its neighboring pixels.

Each of the selected feature points is fed to a feature point updating block 220 and updated therein as described hereinafter. The updated feature point is fed to the motion vector detecting block 210 as the search point, as explained with reference to FIG. 2A, to detect a motion vector for the updated feature point. At the start of processing, the updated feature point is same as the feature point fed from the feature point selection block 200. The motion vector detecting block 210 finds the best matching point for the feature point, e.g., the search point SP4 in FIG. 2A, in the search region SR3 of the skipped frame F3, thereby determining the motion vector MV3 between the search point SP4 and the best matching point in the search region SR3. There are many processing algorithms to detect the motion vector for the feature point. One of the processing algorithms is to first set up a certain size of block for one feature point, and then detect a motion vector for the feature point by using one of the well known block matching algorithms.

The motion vector MV3 is fed to a motion vector accumulator 230 to be stored therein; and to the feature point updating block 220, thereby providing the best matching point SP3 as a new updated feature point to the motion vector detecting block 210. At the motion vector detecting block 210, the best matching point for a new search point, which is the new feature point SP3 in FIG. 2A, is determined in the search region SR2 of the skipped frame F2, thereby determining the motion vector MV2 between the search point SP3 and the best matching point SP2 in the search region SR2. The motion vector MV2 is then sent to the motion vector accumulator 220 to be added to MV3 and to the feature point updating block 220. Such process of detecting a motion vector and updating a feature point is repeated between the skipped frame F2 and the current frame F1. By accumulating the detected motion vectors, e.g., MV1, MV2 and MV3, the motion vector accumulator 220 provides a final motion vector, e.g., MV shown in FIG. 2B, between the feature point SP4 in the previous encoded frame and the best matching point, e.g., SP1, in its corresponding search region, e.g., SR1, within the current frame on the line L20. For all of the feature points in the previous encoded frame,the above process is repeated, thereby providing the first set of motion vectors for the feature points to the prediction block 122 shown in FIG. 1.

Although the present invention has been described with respect to the frame decimation ratio of 3, various frame decimation schemes or ratios may be used in encoding a video signal, and the motion vectors may be calculated in a similar manner as presented herein.

Referring now to FIG. 4, there is shown a detailed block diagram of the prediction block 122. A first set of motion vectors for the feature points are provided from the motion estimation block 126 on the line L20 to a non-feature point motion estimator 214. In the non-feature point motion estimator 214, a second set of motion vectors for each of the non-feature points, i.e, points of the previous encoded frame except the feature points, are determined through the use of the first set of motion vectors for the feature points.

Figure 5:
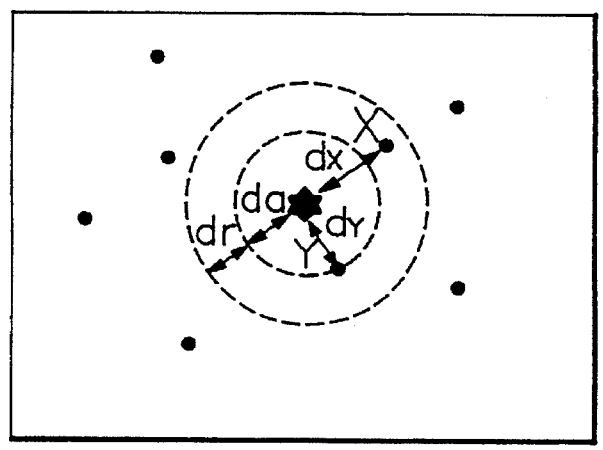
FIG. 5 exemplifies a method for detecting a motion vector for the non-feature points.

FIG. 5 shows an exemplary method of detecting a motion vector for a non-feature point in case where feature points are irregularly distributed in the entire frame. A motion vector for a star marked pixel of non-feature point is calculated by using the feature points which are placed within a circle boundary having a radius of $d_r + d_a$, wherein $d_a$ is the distance of a nearest feature point from the star marked pixel position, and $d_r$ is a predetermined expanded radius for including other feature points to be used in the motion vector calculation. For example, if the nearest feature point to the star marked pixel is "Y", and the feature point "X" is located within the circle boundary of radius $(d_a+d_r)$, the motion vector $(MV_x, MV_y)$ for the star marked pixel is calculated as:

$$(MV_x, MV_y) = \frac{\frac{1}{d_X}(MV_x, MV_y)_X + \frac{1}{d_Y}(MV_x, MV_y)_Y}{\frac{1}{d_X} + \frac{1}{d_Y}}$$

wherein $d_x$ and $d_y$ are the respective distances of feature points X and Y from the star marked pixel position; and $(MV_x, MV_y)_x$ and $(MV_x, MV_y)_y$ are the respective motion vectors for the feature points.

Referring back to FIG. 4, the determined second set of motion vectors for non-feature points are provided to the pixel-by-pixel predictor 216 wherein each value of the pixels to be contained in a predicted current frame is determined with both sets of motion vectors.

While the present invention has been described with respect to the particular embodiments, it will be apparent to those skilled in the art that various changes and modifications may be made without departing from the spirit and scope of the invention as defined in the following claims.

What is claimed is:

1. A method for determining target motion vectors between a current frame and its previous selected frame for a set of feature points, wherein N number of frames are skipped between the current frame and the previous selected frame, said N being a positive integer inclusive of 1, and the set of feature points included in the previous selected frame is predetermined, which comprises the steps of:

(a) storing the N skipped frames;

(b) setting one of the feature points as a reference search point;

(c) determining, for the reference feature point, a best matching point included in a corresponding feature region in an ith skipped frame, thereby generating an ith motion vector representing the displacement between the reference search point and the best matching point and setting the best matching point as the reference feature point, wherein i is a number selected in the ascending order from 1 to N, a smaller value of i being related to a temporally closer frame to the previous selected frame;

(d) storing the ith motion vector;

(e) repeating said steps (c) through (d) above until the first to the Nth motion vectors are obtained;

(f) determining, for the reference feature point, a best matching point included in a corresponding region in the current frame, thereby generating an (N+1)st motion vector representing the displacement between the reference search point and the best matching point;

(g) summing up the (N+1) motion vectors so as to provide a target motion vector representing the displacement between said one of the feature points and the corresponding best matching point in the current frame; and (h) repeating said steps (b) through (g) above until the set of target motion vectors for all of the feature points is detected.

2. A motion estimating apparatus for determining target motion vectors between a current frame and its previous selected frame for a set of feature points, wherein N number of frames are skipped between the current frame and the previous selected frame, said N being a positive integer inclusive of 1, and the set of feature points is included in the previous selected frame, which comprises:

memory means for storing the N skipped frames;

means for selecting the set of feature points in the previous selected frame;

means for providing a reference search point in a reference frame, wherein one of the feature points selected from the previous selected frame is being determined as the reference search point if no motion vector is inputted thereto, and if a motion vector is inputted, the reference search point is updated to a best matching point of the reference search point included in a following frame of the reference point in response to the motion vector, said providing means performs (N+1) reference search points for all of the search points;

motion vector detecting means for determining, for the reference search point, a best matching point included in a search region included in the frame following the reference frame, thereby generating one of successive (N+1) motion vectors which represents the displacement between the reference search point and the best matching point; and means for storing and summing up the successive (N+1) motion vectors so as to provide a target motion vector representing the displacement between said one of the feature points and the corresponding best matching point in the current frame, thereby providing the set of target motion vectors for all of the feature points.

* * * * *